A. JAKOVLEFF.
AUTOMOBILE CRADLE.
APPLICATION FILED OCT. 25, 1920.
1,425,859.
Patented Aug. 15, 1922.
3 SHEETS—SHEET 2.
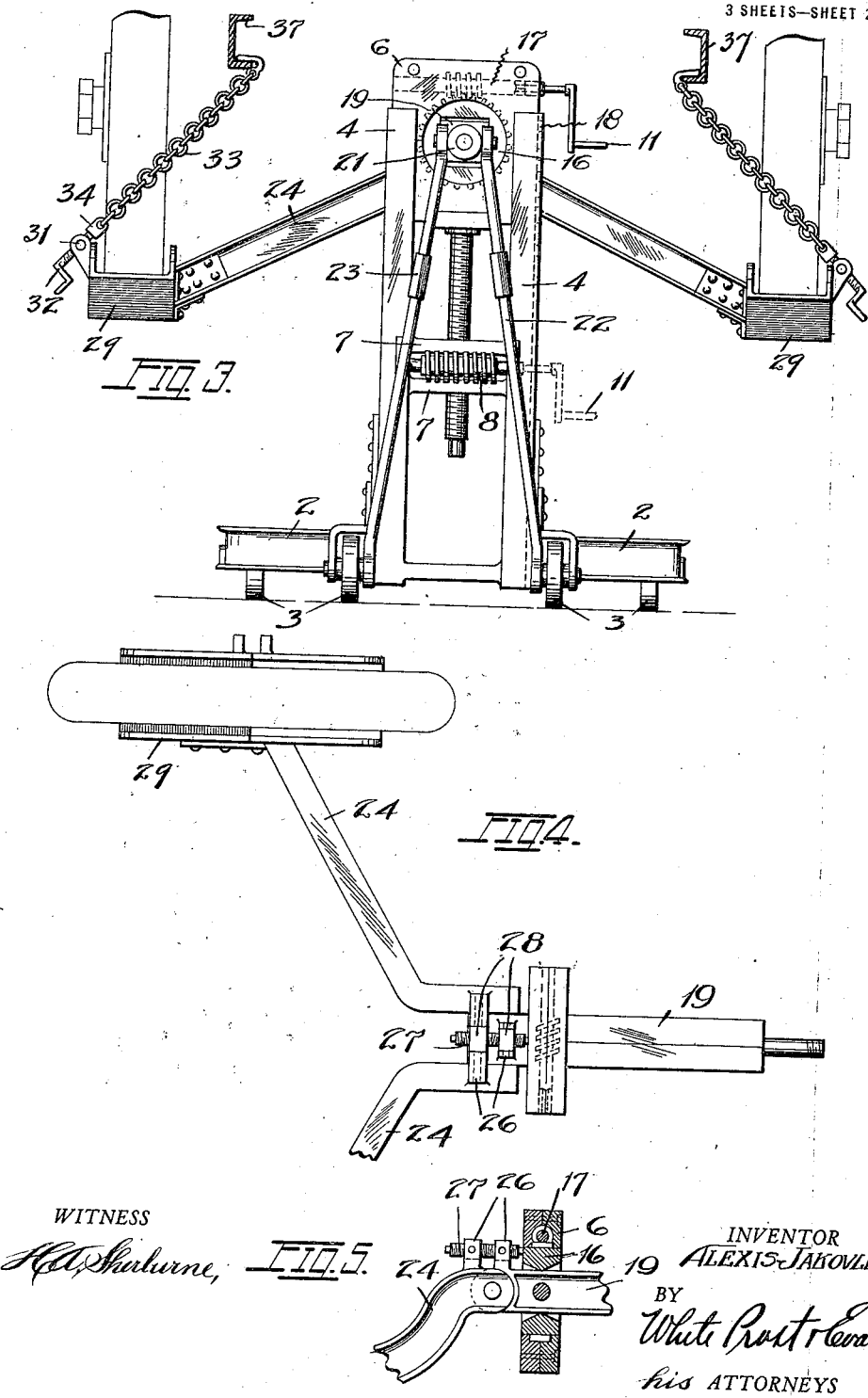
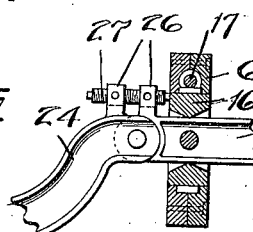
WITNESS
INVENTOR
ALEXIS JAKOVLEFF
BY
his ATTORNEYS

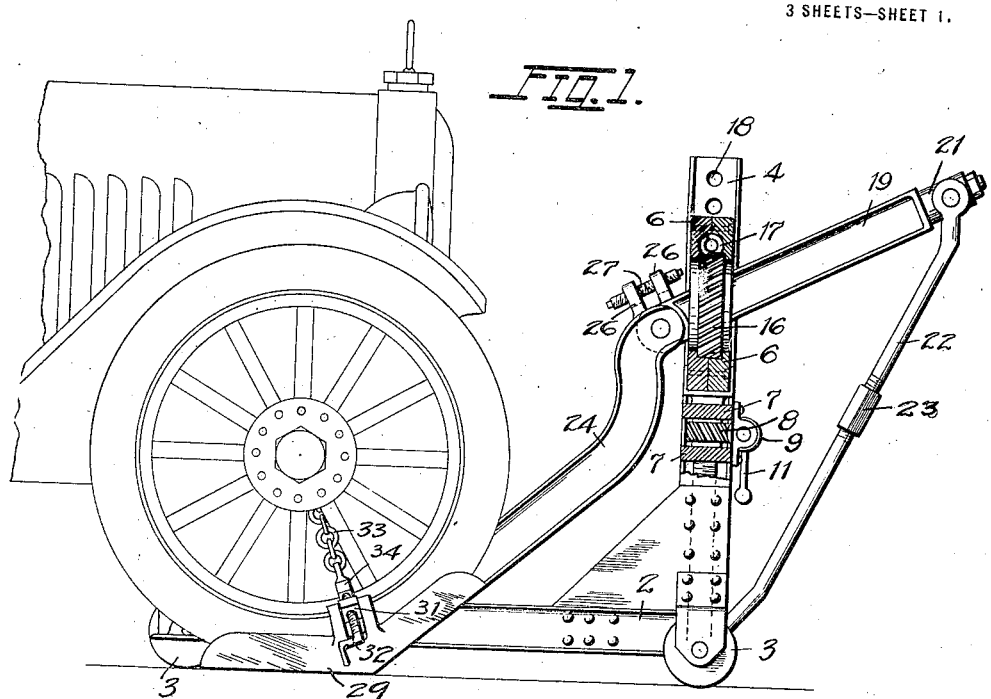
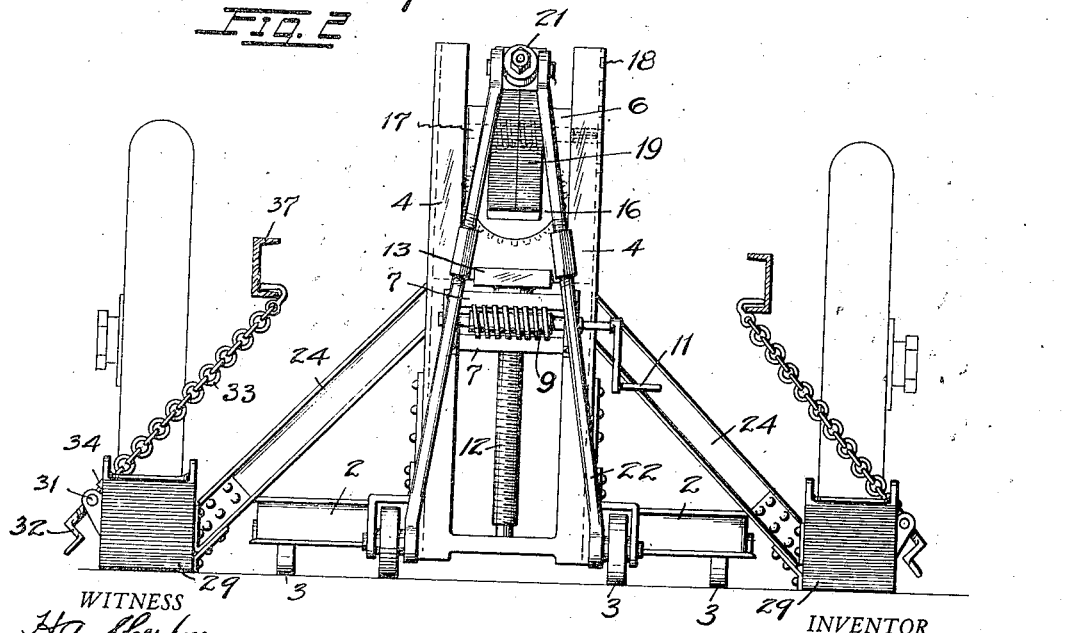

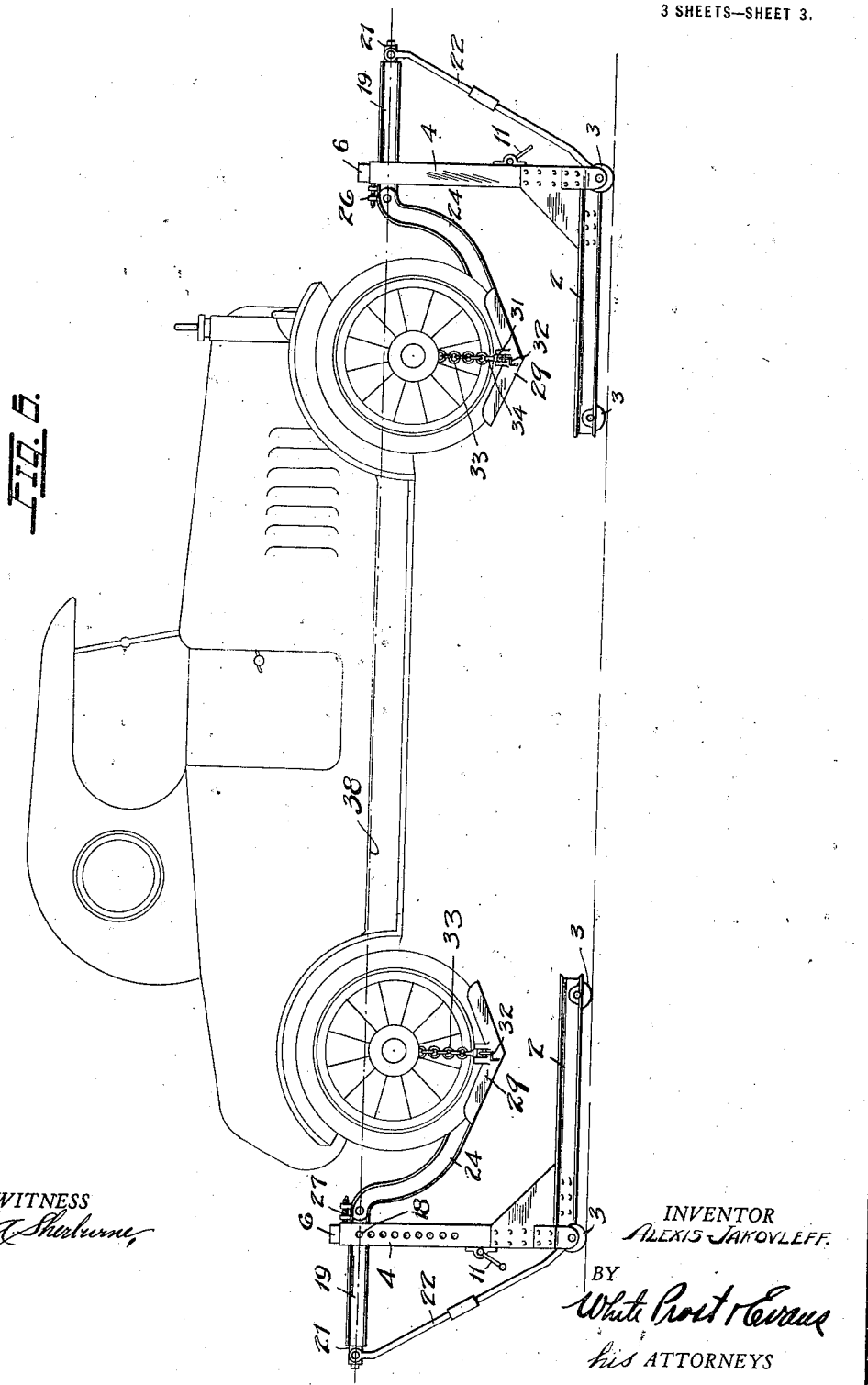

UNITED STATES PATENT OFFICE.

ALEXIS JAKOVLEFF, OF SAN FRANCISCO, CALIFORNIA, ASSIGNOR TO HERBERT M. SHIREK, OF SAN FRANCISCO, CALIFORNIA.

AUTOMOBILE CRADLE.

1,425,859. Specification of Letters Patent. Patented Aug. 15, 1922.

Application filed October 25, 1920. Serial No. 419,409.

*To all whom it may concern:*

Be it known that I, ALEXIS JAKOVLEFF, a citizen of Russia, and a resident of the city and county of San Francisco and State of California, have invented a new and useful Automobile Cradle, of which the following is a specification.

My invention relates to mechanism for raising and tipping automobiles to permit access to the lower parts.

An object of the invention is to provide a cradle wherewith an automobile may readily be raised and turned about a longitudinal axis passing through its center of mass or gravity. Another object is the provision of a cradle of the type described characterized by adjustability to different cars and by ease and rapidity of its application to a car and its operation with the car therein.

Other objects of the invention together with the foregoing will be set forth in the following description of the preferred embodiment of means for practicing the same, which is illustrated in the drawings accompanying and formng part of the specification. It is to be understood that I do not limit myself to the showing made by the said descriptions and drawings, as I may adopt variations of my preferred form within the scope of my invention as set forth in the claims.

In the drawings, Fig. 1 is a side elevation of one of my cradles, showing an automobile therein, but not raised. Fig. 2 is a front elevation of the same. Fig. 3 is a front elevation, showing the automobile raised from the floor. Figs. 4 and 5 are plan and elevation respectively of a portion of the device. Fig. 6 is a side elevation of two of my cradles supporting an automobile in position to be turned about an axis passing substantially through its center of gravity.

The cradle of my invention comprises two similar mechanisms, one for each end of the vehicle. Each mechanism comprises a frame formed of a horizontal element 2 mounted on wheels or rollers 3 so that it is quite close to the floor, and having vertical posts 4 rigidly fixed thereon. Channel beams are preferably used for the frame members and the posts are disposed with the open sides facing each other so that a slide-way is provided in which the rectangular block 6 is adapted to be moved.

Journaled between cross members 7 fixed between the parts is a worm wheel 8 operated by the worm 9 rotatably carried in brackets on the posts. The end of the worm is squared to fit the socketed end of the detachable crank 11. Threaded through the center of the worm wheel is a screw spindle 12, on the upper end of which is pivotally attached the saddle 13 in which the block 6 rests. Rotation of the worm wheel by the crank raises and lowers the block. Rotatably journaled in the block is another worm wheel 16 controlled by the worm 17 arranged in the top of the block. The worm 17 is also provided with a squared end fitting the crank 11, which is connected to the worm through an aperture 18 in the right hand (Fig. 2) post. Thus the worm wheel 16 can be rotated only when the block is raised to such a height that the end of the worm 17 registers with the aperture 18.

Mounted for limited pivotal movement in the worm wheel 16 is an arm 19, the outer end of which (right of Fig. 1) is provided with a collar 21 rotatable thereon. Tension links 22, including turn buckles 23 for varying their lengths, are pivoted to the collar and to the frame. Pivoted on the opposite or inner end of the arm, as best shown in Figs. 4 and 5 is a yoke 24. Lugs 26 on both the arm and yoke, connected by a screw 27 oppositely threaded in blocks 28 rotatably mounted in the lugs, provide means for varying the angular relation between the yoke and its supporting arm.

The ends of the yoke are provided with wheel seats 29, the bottom of each of which is in the form of a wide angle V. One side of the bottom normally rests on the floor as shown in Fig. 1, so as to facilitate the seating of the automobile wheel therein.

Rotatably mounted in lugs on the outside of each wheel seat is a block 31 in which a screw terminating in a crank 32 is threaded. A chain 33 is connected to the screw by a swivel head 34 and at the other end is provided with a hook 36 adapted to be engaged with the frame 37 of the vehicle. This structure provides an adjustable means for locking the wheels of the vehicle in their seats.

When it is desired to work on the under side of an automobile, the front wheels of the car are run upon the wheel seats of one part of my cradle, and the chains 33 attached and tightened. The worm 8 is then turned to raise the block 6 enough to lift the wheel seats under the front wheel clear of the floor. The other or rear half of the cradle is then pushed up close to the rear wheels, and the car backed onto the rear wheel seats. In this movement of the car, the forward cradle rolls backwardly with the car on its wheels 3. The chains on the rear cradle are then attached and tightened and both worms 8 rotated, until the end of the worm 17 in each cradle is alined with the aperture 18, when the arms 19 will be horizontally alined in an axis 38 shown in Fig. 6, passing through or slightly above the center of gravity of the car. Rotation of the screw 27 to vary the angular relation of the arm 19 and yoke 24 permit the cradle to be adjusted to different cars in which the height of the center of gravity may vary. The chains 33 should next be tightened once more to take up any slack which may result from rotary movement of the wheels during the raising of the car. The cranks 11 may now be inserted through the apertures 18 and the worm wheels 16 rotated, care being taken to rotate each substantially the same amount. The arms 19, the connected yokes and the car supported thereon, are thus turned about the axis 38 so as to expose the under portions of the car and permit ready access thereto.

It will be understood that with variations in the length of the tension links, the arm is brought to horizontal position at different heights. There is therefore a series of apertures 18 in the posts 4, the adjustment of the length of the tension link being such as to secure a horizontal position of the arm when the end of the worm 17 is alined with the corresponding aperture. This adjustment will not be used frequently but is preferably included to widen the usefulness of the cradle.

I claim:

1. A vehicle cradle comprising a frame, an arm mounted on said frame, wheel seats arranged on said arm and normally resting on the floor whereby the wheels of the vehicle at one end may be rolled off of the floor upon the seats, means for moving said arm to raise said wheel seats, and means for turning said arm about a horizontal axis.

2. A vehicle cradle comprising a frame, a block slidably mounted in said frame, an arm mounted in said block, wheel seats arranged on said arm and normally resting on the floor whereby the wheels of the vehicle at one end may be rolled off of the floor upon the seats, means for raising said block to lift said arm and wheel seats, and means for turning said arm about a horizontal axis.

3. A vehicle cradle comprising a frame, a block slidably mounted in said frame, an arm pivotally mounted in said block intermediate its ends, means connecting one end of the arm to said frame, wheel seats normally resting on the floor arranged at the other end of said arm, means for raising said block to lift said arm and wheel seats, and means for turning said arm in said block about a horizontal axis.

4. A vehicle cradle comprising a frame, a block slidably mounted in said frame, an arm pivotally mounted in said block intermediate its ends, means connecting one end of the arm to said frame, means for adjusting the length of said connecting means, wheel seats normally resting on the floor arranged at the other end of said arm, means for raising said block to lift said arm and wheel seats, and means for turning said arm in said block about a horizontal axis.

5. A vehicle cradle comprising a frame, an arm mounted on said frame, a yoke pivoted on said arm, wheel seats normally resting on the floor arranged on said yoke, means for adjusting the angle between yoke and arm, means for moving said arm to raise said wheel seats, and means for turning said arm and yoke about a horizontal axis.

6. A vehicle cradle comprising a frame, a block slidably mounted in said frame, an arm pivotally mounted in said block intermediate its ends, means connecting one end of the arm to said frame, means for adjusting the length of said connecting means, a yoke pivoted on the other end of said arm, wheel seats normally resting on the floor arranged on said yoke, means for adjusting the angle between yoke and arm, means for moving said arm to raise said wheel seats, and means for turning said arm and yoke about a horizontal axis.

7. A vehicle cradle comprising a frame, an arm mounted on said frame, wheel seats arranged on said arm and normally resting on the floor whereby the wheels of the vehicle at one end may be rolled off of the floor upon the seats, means for moving said arm to raise the vehicle supported in said wheel seats, means attachable to said vehicle for retaining it in said seats, and means for turning said arm about a horizontal axis.

8. A vehicle cradle comprising a frame, a block slidably mounted in said frame, an arm mounted in said block for pivotal movement therein and for rotary movement about an axis at right angles to the axis of the pivotal movement, means for raising and lowering said block to raise and lower said arm, and wheel seats arranged on said arm.

9. A vehicle cradle comprising a frame, a block slidably mounted in said frame, an arm mounted in said block for pivotal movement therein and for rotary movement about an axis at right angles to the axis of the pivotal movement, means connecting one end of the arm to said frame, wheel seats arranged at the other end of said arm, and means for moving said block to raise and lower said arm.

10. A vehicle cradle comprising a frame, a block slidably mounted in said frame, a worm wheel journaled in said block, a worm in said block for controlling the rotation of said worm wheel, an arm pivoted intermediate its ends in said worm wheel, means for connecting one end of said arm to said frame, means for raising and lowering said block, and wheel seats arranged on the other end of said arm.

11. A vehicle cradle comprising a frame, a block slidably mounted in said frame, a worm wheel journaled in said block, a worm in said block for controlling the rotation of said worm wheel, an arm pivoted intermediate its ends in said worm wheel, means for connecting one end of said arm to said frame, means for raising and lowering said block, wheel seats arranged on the other end of said arm, and means for retaining the vehicle wheels in said seats.

In testimony whereof, I have hereunto set my hand.

ALEXIS JAKOVLEFF.